Jan. 31, 1967   W. A. VON WALD, JR., ETAL   3,301,047
WAVE GAGE ARRAYS FOR OBTAINING OCEAN-WAVE SPECTRA
Filed Nov. 8, 1963                     2 Sheets-Sheet 1

INVENTORS
JACOB E. DINGER
WALTER A. VON WALD, JR.
BY Melvin L. Crane AGENT
Richard S. Sciascia ATTORNEY United States Patent Office 3,301,047
Patented Jan. 31, 1967

3,301,047
WAVE GAGE ARRAYS FOR OBTAINING OCEAN-WAVE SPECTRA
Walter A. Von Wald, Jr., Hillcrest Heights, and Jacob E. Dinger, Silver Hill, Md., assignors to the United States of America as represented by the Secretary of the Navy
Filed Nov. 8, 1963, Ser. No. 322,544
3 Claims. (Cl. 73—170)

The invention described herein may be manufactured and used by or for the Government of the United States of America for governmental purposes without the payment of any royalties thereon or therefor.

The present invention is directed to equipment for telemetering ocean-wave information and more particularly to apparatus and a method of determining the spectra of ocean waves.

Those who are responsible for operation on the oceans desire information on wave height, wave period and the general state of the ocean waters as well as the weather. Heretofore devices have been made available which can be stationed in the oceans by use of buoys to periodically transmit weather conditions such as wind speed, wind direction, barometric pressure, air temperature and water temperature at timed intervals or by remote control. Such information is useful for many purposes; however, additional information on the sea-state is useful to a ship's captain and others.

The present invention is directed to a sensor to obtain some measure of the sea condition. One description of the sea surface is that of an energy spectrum which gives estimates of wave energy as a function of frequency. Energy spectra are usually obtained by digital computer processing of a time series of data of the surface elevations taken over a time interval of the order of 20 minutes. The area under such a spectrum is a measure of the total energy of all the waves. Since the weather buoy cannot be equipped with a complex computer, nor is it practical to supply the power required to transmit 20 minutes of wave-height data to a shore station for analysis, apparatus for obtaining the integrated value of the mean square of the surface deviation over a 20-minute period using a pressure transducer suspended below the buoy and working into an integrating device has been developed. This integrated value is a measure of the total energy of the measured waves.

Trochoidal wave theory depicts ocean waves as circular motions of water particles which decrease exponentially with the depth expressed in wavelength. If one prefers to consider the ocean surface as an infinitely broad distribution of sinusoidal waves, the variations in pressure due to the waves decrease with depth, the rate of decrease being a function of the wavelength. For water depths of the order of a few wavelengths, either concept results in virtually the same rate of decay of wave effects with depth. Because the wave effects diminish with depth as a function of wavelength and because wavelength is directly related to the square of the wave period, the sensor of the present invention is directed to a means for sensing and telemetering the energy spectrum of the ocean waves.

It is therefore an object of the present invention to telemeter ocean-wave information from remotely positioned buoys.

Another object is to provide a method for determining sea condition by use of a remotely positioned buoy.

Still another object is to use simple relatively inexpensive equipment for transmitting sea-state conditions of ocean waters.

Yet another object is to provide a wave height measuring system which is independent of water depth and of bottom pressure.

Other and more specific objects of this invention will become apparent upon a careful consideration of the following description taken together with the accompanying drawings, in which.

The present invention makes use of an electrical calorimeter, such as disclosed in patent application Serial No. 300,948 filed August 8, 1963, to integrate the output of a wave sensor over a period of time, for example, about twenty minutes. One type of weather buoy instrument package presently used has five spare channels for telemetering outputs. These spare channels can be used for telemetering the outputs of wave sensors used in carrying out the teaching of the present invention. Wave sensors are suspended vertically at various depths below a buoy at various depths and evenly spaced along an effectively rigid cable such that the array remains substantially vertical while ascending and decending as the buoy follows the rise and fall of the waves. Less expensive equipped buoys can be used where instrumentation for telemetering only wave information is desired. It is contemplated that the receiving equipment may be ashore, aboard a sea-going vessel, or on an airplane.

Figure 1:
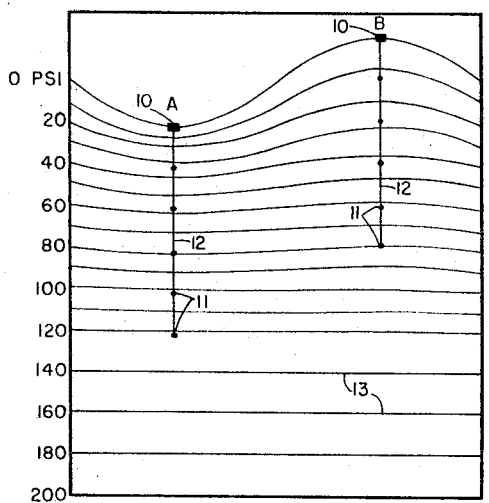
FIG. 1 illustrates a pair of separate spaced buoys each with five wave pressure sensors secured thereto and schematically displayed relative to constant pressure contours for a wave period of 9.34 seconds.

Now, referring to FIG. 1, there is illustrated a buoy 10 having five pressure transducers 11 secured onto vertical cable 12 which is attached to the buoy. The buoy is illustrated in two positions with respect to the wave, that is, as the wave propagates the buoy is first in position A in the trough of the wave, then in position B on the crest of the wave. The somewhat horizontally directed lines 13 illustrates equally-spaced constant-pressure contours that represent corresponding pressure areas for a wave crest and trough. It can be seen that as the buoy goes from position A to position B, the transducer at the top will cross fewer contour lines than does the transducer at the bottom thus the lower transducer will show a greater response because it is encountering a greater pressure change. The pressure change to which each transducer in the array is exposed is proportional to the difference in amplitude between the constant-pressure surface at the water surface and the constant pressure surface at the depth of the transducer. Therefore, the response of each transducer is proportional to 1–K, where K is the factor by which the amplitude of the constant-pressure surface at depth Z is reduced compared to the constant pressure surface at the water surface. K is determined by the formula:

$$K = e^{-2\pi Z/L}$$
$$K = \cos h[2\pi d/L(1-Z/d)]$$

where $d$ is the water depth, Z is the mean depth of the pressure surface and L is the wavelength. One can compute (1–K) for each of the five transducers as illustrated in FIG. 1, for each of the five different wave periods. Each transducer will respond to the five waves but with different sensitivities due to the different depths of the transducers below the buoy. The squared and integrated output over an interval of time of each transducer in the array is a linear combination of such response to the five waves having different periods. Thus one can form a set of linear equations describing the outputs of the five transducers as follows:

$$R_i = (1-K_{ij})^2 E_j \qquad (3)$$

where $R_i$ is the output energy over a given interval from the $i^{th}$ sensor, $K_{ij}$ is the depth attenuation for the $i^{th}$ sensor for the $j^{th}$ wave period and $E_j$ is proportional to the energy associated with the $j^{th}$ wave period. These equations can then be inverted to obtain the $E_j$ in terms of the $R_i$ which is the data telemetered.

The inverted set of equations for an array with the gages located at the 95% response depths for periods of 4, 8, 12, 16 and 20 seconds are:

$$E_{20} = +0.393R_{39} - 2.80R_{157} + 12.39R_{352} \\ - 28.5R_{626} + 18.56R_{978} \quad (4)$$

$$E_{16} = -1.000R_{39} + 7.12R_{157} - 29.8R_{352} \\ + 53.6R_{626} - 30.0R_{978} \quad (5)$$

$$E_{12} = +1.46R_{39} - 10.03R_{157} + 28.12R_{352} \\ - 38.61R_{626} + 19.20R_{978} \quad (6)$$

$$E_8 = -2.67R_{39} + 7.11R_{157} - 12.19R_{352} \\ + 14.28R_{626} - 6.79R_{978} \quad (7)$$

$$E_4 = +1.84R_{39} - 1.56R_{157} + 2.26R_{352} \\ - 2.71R_{626} + 1.35R_{978} \quad (8)$$

The subscripts on the E's indicate period; those on the R's indicate depth.

Since a short appendage to the buoy might be much more convenient in field operations than a long one, an array of gages located at the 10%-response depths is also considered. The inverted set of equations for the short array are:

$$E_{20} = +18,271.R_{4.9} - 5,102.R_{19.8} + 1,766R_{44.6} \\ - 405.9R_{79.4} + 31.4R_{124} \quad (9)$$

$$E_{16} = -32,870.R_{4.9} + 8,814.R_{19.8} - 2,689.R_{44.6} \\ + 400.0R_{79.4} + 37.4R_{124} \quad (10)$$

$$E_{12} = +14,474.R_{4.9} - 3,783.R_{19.8} + 1,064.R_{44.6} \\ - 111.5R_{79.4} + 2,86R_{124} \quad (11)$$

$$E_8 = -1.721.R_{4.9} + 430.5R_{19.8} + 109.2R_{44.6} \\ + 94.1R_{79.4} - 2.86R_{124} \quad (12)$$

$$E_4 = +43.3R_{4.9} - 75.9R_{19.8} + 15.7R_{44.6} \\ - 0.15R_{79.4} - 3.06R_{124} \quad (13)$$

Obviously the coding system resolution required to use the short array would be greater than that required to use the long array.

Once the equations for 4, 8, 12, 16 and 20 second periods have been solved to obtain five estimates of the energy spectrum the location of any maximum might or might not be indicated. If a maximum is indicated, another set of equations for a more narrow range of periods can be determined and solved to locate the energy maximum in more detail.

Figure 2:
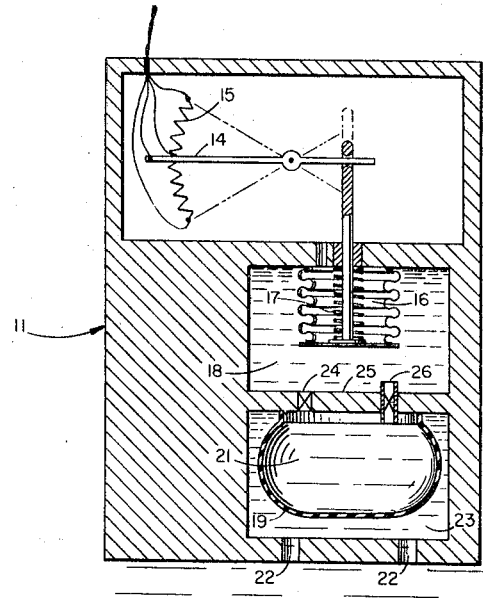
FIG. 2 illustrates an illustrative wave sensor-pressure transducer.

FIG. 2 illustrates an operable pressure transducer. The transducer and variable resistance element are assembled in a water-tight housing and the electrical wire connections are brought out of the housing lid through a water-tight seal. A movable arm 14 of a double resistance unit 15 with the arm normally positioned at the center of the resistor unit is connected to the pressure differential chamber 16 by a movable arm. A spring 17 within the pressure differential chamber operates against outside pressure to record the correct pressure. The pressure differential chamber is surrounded by oil in area 18. A separate chamber in the bottom of the housing below the pressure differential chamber contains a diaphragm 19 with oil on the upper side 21 and opening 22 in the bottom of the housing which permits sea water to enter the area 23 below the diaphragm 19. A slow leak valve 24 is positioned in the partition 25 between oil chambers 18 and 21 to permit oil to slowly pass from one chamber to the other depending on the pressure of the sea water. An over pressure valve 26 is also positioned between the two oil containing areas to relieve the pressure from the upper chamber.

Figure 3:
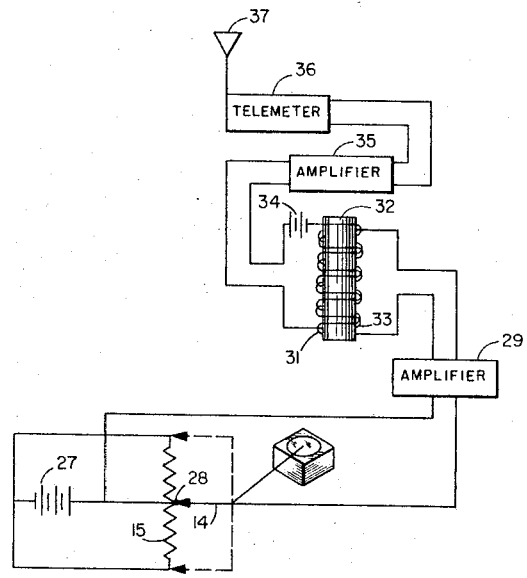
FIG. 3 illustrates a pressure sensor secured to a system for telemetering wave information.

Each of the pressure transducers 11 secured to the cable 12 attached to a weather buoy 10, or any other appropriate buoy, are connected to an electrical calorimeter-telemetering system such as described in application Serial No. 300,948, filed August 8, 1963, which integrates and telemeters the signal to any suitable receiver-recorder. Such a system is illustrated by the schematic drawing in FIG. 3. As shown, a differential pressure transducer 11 is connected to the movable arm 14 of a double resistance unit 15 which arm is normally positioned at the center null position of the resistor unit. An electrical power source 27 is connected with one side going to the center tap 28 of the resistance unit to provide a null position, and the other side of the power source is connected to each end of the resistance unit. Any electrical outputs between the end taps and the movable arm 14 is directed to amplifier 29 of any suitable type. The output of the amplifier is then connected to a heater coil 31 that surrounds a heat conductive material such as a thermistor or a coil of temperature resistance wire 33 surrounds the heater coil to detect any change in the temperature of the copper bobbin. The temperature sensor element changes resistance in accordance with the heat of the copper bobbin and permits a corresponding current flow from an electrical power supply 34. The current passing through the resistor is amplified by amplifier 35 which is connected with any suitable telemetering equipment 36 that sends out a signal through antenna 37. The telemetered signal is received by any suitable receiving equipment which may be abroad an airplane, a ship, or land based. The telemetering equipment is programmed for sending signals over specific time intervals or it may be interrogated for sending out information at times other than at the timed intervals. The system could also be used for continuous signals. When operated intermittently, the system integrates the input power over an interval of time that is essentially limited by the thermal time constant of the device. When operated continuously, the device averages the input power over an interval of the time that is mathematically related to its thermal time constant.

It has been determined that a 30 gram copper bobbin in the center of a three inch cube of foam plastic has a thermal time constant of about 20 minutes and averages over a 20 minute period with very good accuracy.

In operation for intermittent signal transmission, a timer controls the power sources for the heater element and the heat sensor-transmitting unit. The power sources are turned on, the buoy floats on the water surface and follows the waves over the crest and into the troughs as the waves pass the buoy. The differential pressure transducer is normally centered along the resistance unit such that no voltage flows through the amplifier through the movable arm. As the buoy rises over the crest of the wave, the pressure on the transducer decreases moving the movable arm along the resistance portion to permit a voltage flow through amplifier 29 to amplify the voltage and thereby apply a higher voltage across the heater element. The less the pressure on the transducer due to the height of the wave the greater the heater element will heat the copper bobbin. Now, as the buoy rides over the crest and into the trough the buoy will go below the normal surface and pressure on the transducer will be greater than at normal such that the movable arm will go through zero and cross onto the other resistance position to permit a voltage flow such as described above when the buoy rode over the crest of the wave. Thus the heater element produces heat during the time the buoy is above and below normal. The resistance temperature wire coil detects the change in the temperature of the copper bobin and this change permits a current flow which is amplified and telemetered by the telemetering equipment. The output of the telemetering equipment is recorded and analyzed to determine the wave spectrum. Each pressure transducer secured to the cable will give its own separate output according to the pressure at the depth of the transducer. Thus by analyzing all of the output curves the period, height, length, etc., of the wave condition can be determined.

Obviously many modifications and variations of the

What is claimed is:
1. A wave analysis system which comprises:
    (a) a buoy,
    (b) at least one electrical calorimeter-telemetering system secured within said buoy,
    (c) a line secured to said buoy and extending vertically downwardly from said buoy,
    (d) at least one differential pressure transducer secured onto said vertically extending line secured to said buoy,
    (e) said differential pressure transducers equal in number to that of said electrical calorimeter-telemetering systems,
    (f) a separate variable resistor element controlled by one each of said differential pressure transducers,
    (g) said resistor element comprising a pair of resistors with a center tap providing a null position between said resistors and a movable arm normally positioned at said null position and movable along said resistors in electrical contact therewith on opposite sides of said null position,
    (h) an electrical power source with one side connected to said center tap of said resistor element and the other side of said electrical power source connected to the outer ends of each of said resistors,
    (i) each of said pressure transducers mechanically connected with said movable arm of one each of said separate variable resistor elements, whereby
    (j) said movable arm moves from said normal null position along said resistance element to supply different voltages to one each of said electrical calorimeter-telemetering systems in said buoy in accordance with any pressure change on said pressure transducer.

2. A wave analysis system which comprises:
    (a) buoy,
    (b) a plurality of electrical calorimeter-telemetering systems secured within said buoy,
    (c) a line secured to said buoy and extending downwardly vertically from said buoy,
    (d) a plurality of equally spaced differential pressure transducers secured onto said vertically extending line connected to said buoy,
    (e) a separate variable resistor element controlled by one each of said plurality of said differential pressure transducers,
    (f) said resistor element comprising a pair of resistors with a center tap providing a null position between said resistors and a movable arm normally positioned at said null position and movable along said pair of resistors in electrical contact therewith on opposite sides of said null position and,
    (g) an electrical power source connected with one side to said center tap of said resistor element and the other side of said electrical source connected to the outer end of each of said resistors,
    (h) each of said plurality of pressure transducers mechanically connected with said movable arm of one each of said resistor elements, whereby
    (i) said movable arm moves from said normal null position along said resistance element to supply different voltages to one of each of said electrical calorimeter-telemetering systems in said buoy in accordance with any pressure change on said pressure transducer.

3. A wave analysis system as claimed in claim 2 wherein there are at least five pressure transducers and at least five electrical calorimeter-telemetering systems for telemetering information from said pressure transducers.

References Cited by the Examiner

UNITED STATES PATENTS

| 2,651,015 | 9/1953 | Meredith | 318—489 |
| 2,839,920 | 6/1958 | MacAnespie | 73—170 |
| 2,869,108 | 1/1959 | Smith | 340—2 |
| 3,045,492 | 7/1962 | Kutzler | 73—398 X |

FOREIGN PATENTS

| 147,786 | 11/1962 | Russia. |
| 140,997 | 6/1958 | Russia. |

RICHARD C. QUEISSER, *Primary Examiner.*

J. J. SMITH, *Assistant Examiner.*